United States Patent [19]

Taylor

[11] Patent Number: 5,510,023
[45] Date of Patent: Apr. 23, 1996

[54] OIL RECYCLING APPARATUS WITH A RECIRCULATING FILTRATION LINE

[76] Inventor: John I. Taylor, 501 W. First St., Pittsburg, Kans. 66762

[21] Appl. No.: 288,739

[22] Filed: Aug. 8, 1994

[51] Int. Cl.[6] ................................................. B01D 35/18
[52] U.S. Cl. ..................... 210/180; 210/168; 210/184; 210/196; 210/197; 210/416.5; 210/436; 210/439; 210/441; 210/473; 210/502.1
[58] Field of Search ................................. 210/168, 180, 210/184, 196, 197, 416.1, 416.5, 436, 439, 441, 473, 502.1

[56] References Cited

U.S. PATENT DOCUMENTS

| | | |
|---|---|---|
| 1,981,089 | 11/1934 | Carpenter . |
| 2,027,876 | 1/1936 | Pennebaker . |
| 2,262,528 | 11/1941 | Fairlie et al. . |
| 2,425,848 | 8/1947 | Vawter . |
| 2,428,486 | 10/1947 | De Puydt . |
| 3,954,611 | 5/1976 | Reedy ............................... 210/71 |
| 4,217,221 | 8/1980 | Masso ............................... 210/168 |
| 4,454,036 | 6/1984 | Suzuki ............................... 210/117 |
| 4,534,861 | 8/1985 | Wedemeyer et al. ............ 210/168 |
| 4,650,572 | 3/1987 | Hayes ............................... 210/168 |
| 5,080,791 | 1/1992 | Sims ............................... 210/497.1 |
| 5,112,479 | 5/1992 | Srimongkolkul ................ 210/149 |
| 5,178,753 | 1/1993 | Trabold ........................... 210/130 |
| 5,417,851 | 5/1995 | Yee ................................. 210/168 |

*Primary Examiner*—Robert A. Dawson
*Assistant Examiner*—Robert James Popovics

[57] ABSTRACT

This invention relates to an apparatus for recycling oil that has been removed from a vehicle of some type such as an automobile or tractor. The invention has a container with an access lid for inserting the oil to be processed. A heater is provided to insure that the oil will be of a temperature that it will be properly processed. A filter system is included which is mounted on top of the container. A pump moves the oil from the bottom of the container to the bottom of the filter system. Pressure then forces the oil through the filter system to a pipe which moves the oil back to the container for another cycle. Oil is continuously recycled from the container, through the filter and back to the container for several hours until the oil is clear. It is then ready for removal and reuse.

5 Claims, 1 Drawing Sheet

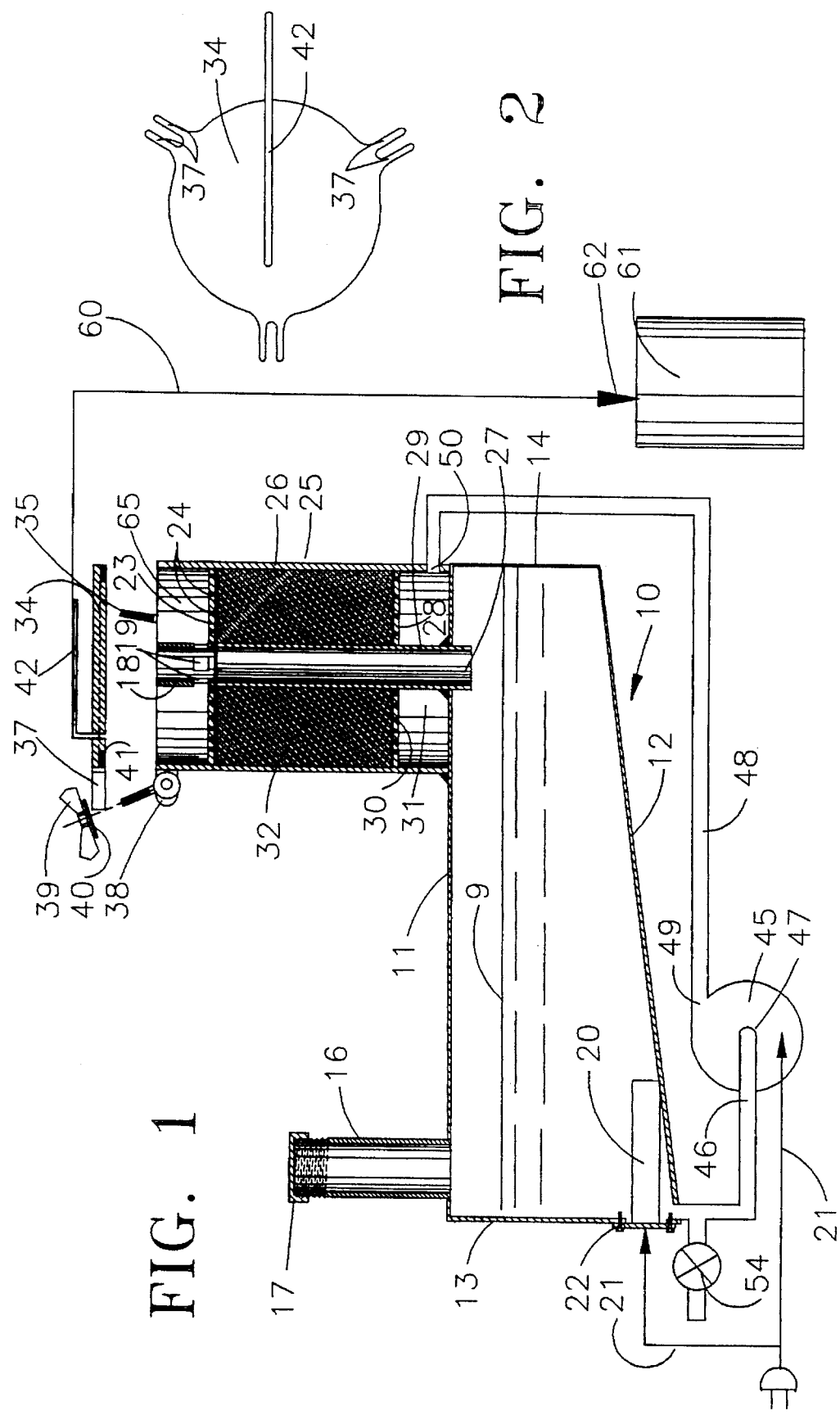

OIL RECYCLING APPARATUS WITH A RECIRCULATING FILTRATION LINE

BRIEF DESCRIPTION OF THE PRIOR ART

Several patents have been issued in the past relating to the reconditioning of oil, all of these patents, however, are either mounted in some kind of a vehicle or very expensive to build and use.

Devices which are mounted in vehicles for the reconditioning of used oils which are circulated in the automobile are the U.S. Pat. No. 1,981,089 to Jesse J. Carpenter, which illustrates an inlet from the vehicle oil source, a pipe which conveys the oil to a filter unit, to a settling reservoir and then back to the engine; U.S. Pat. No. 5,112,479 issued to Vichai Srimongkolkul, is a unit which is a one time pass through filter system which is connected to an oil source for filtering, the filtered product is stored in a separate container; U.S. Pat. No. 3,954,611 issued to Elvie L. Reedy is a patent similar to the U.S. Pat. No. 5,112,479 U.S. Pat. No. 2,027,876 issued to Robert H. Pennebaker, is another patent which provides oil filtering from a remote source and returns the oil to said source. Paper filters are illustrated in the U.S. Pat. No. 5,080,791 which illustrates the use of paper towels for the filtering element, but speaks of the use of toilet paper as a useful filtering element. The U.S. Pat. No. 2,425,848 to D. Vawter, U.S. Pat. No. 2,428,486 to F. A. De Puydt, U.S. Pat. No. 5,178,753 to Hermann Trabold and U.S. Pat. No. 2,262,528 to M. Fairlie, et al ar all various filter arrangements similar to those previously discussed. Standard automobile filters such as U.S. Pat. No. 4,454,036 to Shinichi Suzuke, are of the same type except that automobile filters don't have to heat the oil because it is already heated.

BRIEF DESCRIPTION OF THE INVENTION

This invention relates to an apparatus for recycling oil that has been removed from a vehicle of some type such as an automobile or tractor. The invention has a container with an access lid for inserting the oil to be processed. A heater is provided to insure that the oil will be of a temperature that it will be properly processed. A filter system is included which is mounted on top of the container. A pump moves the oil from the bottom of the container to the bottom of the filter system. Pressure then forces the oil through the filter system to a pipe which moves the oil back to the container for another cycle. Oil is continuously recycled from the container, through the filter and back to the container for several hours until the oil is clear. It is then ready for removal and reuse.

BRIEF DESCRIPTION OF THE FIGURES

FIG. 1 is a cross section of the apparatus; and,

FIG. 2 is a top full view of the lid for the filter system illustrated in FIG. 1.

DETAILED DESCRIPTION OF THE INVENTION

Referring to both figures but in particular to FIG. 1, a reservoir referred to generally by arrow 10, has a top 11, bottom 12, a front portion 13, rear portion 14, and sides 15 (only one of which is illustrated). Top portion 11 has attached thereto an entry tube 16 with a cap or lid 17 for inserting the oil into reservoir 10. Tube 16 could also be a hinged door, for example. A thermostaticly controlled heater 20 is mounted through front portion 13 and attached by means of screws 22. A seal (not shown) is placed around the attachment location to prevent leakage of oil to the outside of the unit. Heater 20 is connected to a source of electrical power through a wire 21.

A filtering chamber generally referred to by 25 is constructed by welding or otherwise attaching a tube 26 to top portion 11. A central pipe 27 is mounted axially in tube 26 and through top portion 11 in a manner to provide fluid communication from filtering chamber 25 to reservoir 10. A disc 28 is attached to the interior of tube 26 so that the normal axis of the disc is aligned with the axis of tube 26. Disc 28 has an opening 29 of a diameter to snugly fit over the outside of tube 22. Disc 28 also has a plurality of openings or holes 30 to provide for the passage of oil from a lower chamber 31 formed by the walls of tube 26, disc 28 and top 11. A filtering element 32 fills the space between the interior wall of tube 26 and the exterior wall of central pipe 27. The length of central pipe 27 is made to extend at least to the top of filtering element 32. A lid 34 is placed over the top of tube 26 and is anchored by a plurality of bolts 35. Lid 34 has a plurality of pares of ears 37 which are adapted to receive bolt 35 which is pivoted about its attachment anchor 38 until bolt 35 is in the slot formed by the pair of ears 37 until it is vertical at which time an wing-nut 40 is placed over screw 35 and tightened. A seal 41 keeps the gasses in the unit. A breather tube 42 provides an exit for water vapor. Breather tube 42 is connected through piping indicated by line 60 to a canister 61 as indicated by arrow 62. Canister 61 is filled with a detergent to collect all the acids and water and vapors from filtering chamber 25. An filter retaining disc 23 is similar to disc 28 and made in the same manner with holes 24 for the passage of oil therethrough. A retaining tube 18 has holes or openings 19 so that the oil accumulating in upper chamber 65 can pass into the central pipe 27.

A pump 45 is connected through a pipe 46 to the low end of bottom 12 and to the inlet 47 of pump 45. A second pipe 48 is connected from an outlet 49 of pump 45 to the interior of lower chamber 31 at its inlet 50. Lid 16 is fastened by lowering lid 16 against top 11. Pump 45 is connected to a source of power through a wire 54. It is obvious that switches can be inserted wherever necessary or desired to selectively heat or operate the pump. Pilot lights can also be installed as desired, all of which is well known in the art. An drain valve 54 is connected through a pipe 55 to the bottom 12 of reservoir 10.

OPERATION OF THE APPARATUS

The oil recycling apparatus operates in the following manner. Used oil is inserted into the unit by removing cap 17 and pouring the oil to be recycled down tube 16 into reservoir 10 to a level 9 and replacing cap 17. The oil to be recycled will then be deposited into reservoir 10. Reservoir 10 can be designed to hold as few as five quarts or as many as desired. Usually not less than 5 quarts would be recycled since the capacity of most vehicles is five quarts. It is obvious that less than five quarts could be recycled as long as enough is in the unit to fill the pipes and the filter 32, lower chamber 31, pipe 27 and connecting pipes 46 and 48.

Once the oil is inserted into reservoir 10, heater 20 is turned on. The unit preferably functions by having a thermostaticly controlled switch operate the pump once the oil is to temperature of 140 to 155 degrees fahrenheit. When the pump is operated, oil will pass down pipe 46 to the inlet 47 of pump 45, it is then pressured and expelled from the pump at outlet 49 through pipe 48 to inlet 50 of lower chamber 31.

Since the oil is under pressure, it will be forced upwardly through holes 30 and through filter 32, through disc 23 by means of holes or openings 24 to the upper chamber 65. The oil will then flow through openings 19 of tube 18 and into axial tube or pipe 27, back to reservoir 10 where it is again subjected to recycle repeatedly until it is clean. The basic function of disc 23 and retainer tube 19 is to keep filter element 32 in its place. The pressure of the oil would force filter element 32 out of its proper place against disc 28. Lid 34 keeps retainer tube 18 in position. The usual time for completely recycling five quarts of oil is from three to three and one-half hours.

The filter is extremely cheep, being only a roll of toilet paper. The inside diameter of pipe 26 is sized to accept the roll of toilet paper. The outside diameter of pipe 27 is likewise sized to fit the center hole of a roll of paper. To remove the roll, one simply reaches into pipe 26 with a rod with a small hook or the like (not shown) to the bottom of the filter 32 and pulls up, the hook engaging the filter which slides out easily. The top 34 and the retainer tube 18 along with disc 23 are also removed after removing wing-nuts and washers 37. Since the temperature is above 140 degrees fahrenheit, any water or acids in the oil will vaporize and be expelled out of the oil through vent 42 and down pipe 60 to vessel 61 where the water mixed with detergent will accumulate the water, acids and odors from the unit.

Once the oil has been recycled enough to completely clean the oil, valve 54 is opened and the recycled oil removed.

One important feature of this invention is that the temperature is low enough that the apparatus can be manufactured of high temperature plastic such as that used to manufacture hot water plastic pipes.

CONCLUSIONS

An extremely economical oil recycling apparatus has been disclosed that can be owned by any person owning any form of vehicle which uses oil. The apparatus will completely remove all particulate matter, metal, carbon, water, acids and the like and restore the oil to its former condition. Furthermore, it will prevent a large quantity of contaminate from entering the land fills, sewers, dirt and the like, thereby substantially improving the environment.

It is obvious that other filter mediums can be substituted and still be within the scope of the invention, it is also obvious that modifications and changes can be made to the invention as described in the specification and appended claims and still be within the spirit and scope of the invention.

What I claim is:

1. An oil recycling apparatus comprising:

a. a reservoir having sides, inlet means, outlet means, a bottom and a top;

b. tube means attached to said reservoir top defining a closed bottom, said tube means having a removable top and a pipe axially disposed therein, said axial pipe having a first end extending through said reservoir top placing the interior of said tube means in fluid flow communication with the interior of said reservoir by way of openings in a second end;

c. upper and lower filter element retaining means positioned within said tube means and each having a first opening to accommodate said axial pipe and a plurality of second openings to provide a passage for said oil;

d. pump means having an inlet connected to said reservoir bottom and an outlet connected to said tube means between said reservoir top and said lower filter element retaining means for pumping oil from said reservoir to said tube means;

e. temperature control means mounted through said reservoir in a manner to heat said oil; and, f. filter element means disposed within said tube means between said element retaining means and around said axial pipe, said lower retaining means being spaced a distance from said reservoir top and said upper retaining means being spaced a distance below said openings in said pipe;

whereby oil added to said reservoir is pumped from the bottom of said reservoir to said tube means, then, passing through said plurality of openings in said lower retaining means, through said filter element means, through said upper retaining means, into said pipe openings, and back to said reservoir, having first been heated by said temperature control means.

2. An oil recycling apparatus as claimed in claim 1, wherein said reservoir is formed of a box having vertical sides, a flat top and a sloping bottom, wherein said inlet means is mounted to the top of said reservoir and includes a removable, sealable lid for the addition of oil.

3. An oil recycling apparatus as claimed in claim 1, additionally including a pipe means coupled through said removable top means to a reservoir filled with water and detergent.

4. An oil recycling apparatus as claimed in claim 1, additionally including means coupled to said tube means for the removal of acids and vapor, and means coupled to said removal means for disposing of said acids and vapor.

5. An oil recycling apparatus as claimed in claim 4, wherein said means for disposing of said acids and vapor comprises a vessel which can be filled with water and detergent.

\* \* \* \* \*